United States Patent
Tisch et al.

(10) Patent No.: US 12,400,684 B2
(45) Date of Patent: Aug. 26, 2025

(54) APPARATUS AND METHOD OF REMOVING SELECTIVE SOUNDS FROM A VIDEO

(71) Applicant: GoPro, Inc., San Mateo, CA (US)

(72) Inventors: Erich Tisch, San Francisco, CA (US); Paul Finkel, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/732,123

(22) Filed: Jun. 3, 2024

(65) Prior Publication Data

US 2024/0321316 A1  Sep. 26, 2024

Related U.S. Application Data

(63) Continuation of application No. 17/979,017, filed on Nov. 2, 2022, now Pat. No. 12,002,492.

(60) Provisional application No. 63/275,909, filed on Nov. 4, 2021.

(51) Int. Cl.
  *G11B 27/031* (2006.01)
  *G08B 3/00* (2006.01)
  *H04N 5/91* (2006.01)

(52) U.S. Cl.
  CPC .............. *G11B 27/031* (2013.01); *G08B 3/00* (2013.01); *H04N 5/91* (2013.01)

(58) Field of Classification Search
  CPC ........... G11B 27/031; G08B 3/00; H04N 5/91
  See application file for complete search history.

(56) References Cited

U.S. PATENT DOCUMENTS

| | | |
|---|---|---|
| 9,489,937 B1 | 11/2016 | Beard |
| 9,984,672 B2 | 5/2018 | Fong |
| 10,546,571 B2 | 1/2020 | Fong |
| 11,024,279 B2 | 6/2021 | Fong |
| 12,002,492 B2 | 6/2024 | Tisch |
| 2004/0199082 A1 | 10/2004 | Ostroff |
| 2015/0336671 A1 | 11/2015 | Winn |
| 2016/0063987 A1 | 3/2016 | Xu |
| 2016/0070264 A1 | 3/2016 | Hu |
| 2016/0183003 A1 | 6/2016 | Bender |
| 2017/0274984 A1 | 9/2017 | Beckman |
| 2018/0075834 A1 | 3/2018 | Fong |
| 2018/0322860 A1 | 11/2018 | Fong |
| 2018/0350383 A1 | 12/2018 | Moghimi |

(Continued)

FOREIGN PATENT DOCUMENTS

| | | |
|---|---|---|
| JP | 2017213970 A | 12/2017 |
| WO | 2016118626 A1 | 7/2016 |

OTHER PUBLICATIONS

Ishiki et al. (Design Model of Microphone Arrays for Multirotor Helicopters), Sep. 28-Oct. 2, 2015 https://ieeexplore.ieee.org/document/7354252?source=IQpl us https://ieeexplore.ieee.org/stamp/stamp.jsp?tp=&arnumber=7354252 (Year: 2015).

*Primary Examiner* — Mishawn N. Hunter
(74) *Attorney, Agent, or Firm* — Young Basile Hanlon & MacFarlane, P.C.

(57) ABSTRACT

An apparatus including a microphone, a speaker, and a processor. The speaker is configured to produce a sound that audibly communicates information to a user. The microphone is configured to receive the sound. The processor is configured to produce the sound through the speaker to audibly communicate information to the user; capture a video that includes audio; initiate a sound removal process to remove the sound from the audio; and after the sound is produced, stop the sound removal process.

20 Claims, 7 Drawing Sheets

(56) References Cited

U.S. PATENT DOCUMENTS

| | | |
|---|---|---|
| 2020/0052667 A1 | 2/2020 | Jeon |
| 2020/0160825 A1 | 5/2020 | Fong |
| 2021/0358469 A1 | 11/2021 | Fong |
| 2024/0144972 A1 | 5/2024 | Tisch | ated a sound removal process to remove the sound from
APPARATUS AND METHOD OF REMOVING SELECTIVE SOUNDS FROM A VIDEO

CROSS-REFERENCE TO RELATED APPLICATION(S)

This application is a continuation of U.S. patent application Ser. No. 17/979,017, filed Nov. 2, 2022, which claims priority to and the benefit of U.S. Provisional Application Patent Ser. No. 63/275,909, filed Nov. 4, 2021, the entire disclosure of which is hereby incorporated by reference.

TECHNICAL FIELD

This disclosure relates to an image capture device that provides sounds indicating that a video is being taken and a method and apparatus for removing the sounds from the video.

BACKGROUND

Generally, image capture devices are available that are capable of capturing both images and videos. These image capture devices may provide a sound indicating that an image or video is about to be taken such that the user or group of participants are alerted that an image or video is about to be captured.

SUMMARY

Disclosed herein are implementations of an apparatus including a microphone, a speaker, and a processor. The speaker is configured to produce a sound that indicates an image capture device comprising the microphone is recording. The microphone is configured to receive the sound. The processor is configured to initiate a sound removal process to remove the sound; produce the sound through the speaker to indicate that the image capture device is recording a video that includes audio; and after the sound is produced, stop the sound removal process.

The present teachings provide a method that includes initiating a sound and removing the sound. The method includes initiating the sound removal process. After initiation of the sound removal process, the method includes producing the sound that is indicative of an image capture device recording a video that includes audio. Upon completion of producing the sound, the method includes stopping the sound removal process.

The present teachings provide an image capture device comprising: a speaker, a microphone, and an image sensor. The speaker is configured to produce a sound indicating that the image capture device is recording. The microphone configured to receive the sound. The image sensor configured to capture a video while the microphone is recording. A processor configured to: initiate a sound removal process to remove the sound from the recording. The processor configured to produce the sound to indicate that the image sensor and microphone are recording a video that includes audio. The processor configured to stop the sound removal process after a predetermined amount of time.

The present teachings provide: an apparatus including a microphone, a speaker, and a processor. The speaker is configured to produce a sound that audibly communicates information to a user. The microphone is configured to receive the sound. The processor configured to: produce the sound through the speaker to audibly communicate information to the user; capture a video that includes audio; initiate a sound removal process to remove the sound from the audio; and after the sound is produced, stop the sound removal process.

The present teachings provide: a method including initiating a sound removal process. After initiation of the sound removal process, producing a sound that audibly communicates information to a user. Upon completion of producing the sound, stopping the sound removal process.

The present teachings provide: a image capture device with a speaker, a microphone, an image sensor, and a process. The speaker is configured to produce a sound that audibly communicates information to a user. The microphone is configured to receive the sound. The image sensor is configured to capture a video while the microphone is recording. The processor is configured to: initiate a sound removal process to remove the sound from the recording; produce the sound to audibly communicate information; and stop the sound removal process after a predetermined amount of time.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present teachings provide an image capture device that captures videos and audio related to the video. The image capture device includes speakers and microphones. The speakers may produce an audible sound (e.g., a beep) so that a user of the device knows the device is recording when the device is in a location where the user is not able to monitor the recording status (e.g., on a helmet, a headband, or a backpack). The device taught herein may filter out the sound being produced so that when the video is watched later, the sound is not part of the audio recording. The device may include a processor that removes the sound from an audio recording, before the audio is stored, or both. The processor is configured to apply sound removal so that the sound is filtered out while the audio and video are being recorded or filtered out before an audio recording is made or completed. The processor is configured to perform a process of removing the sound without disrupting the audio being recorded.

Figure 1A:
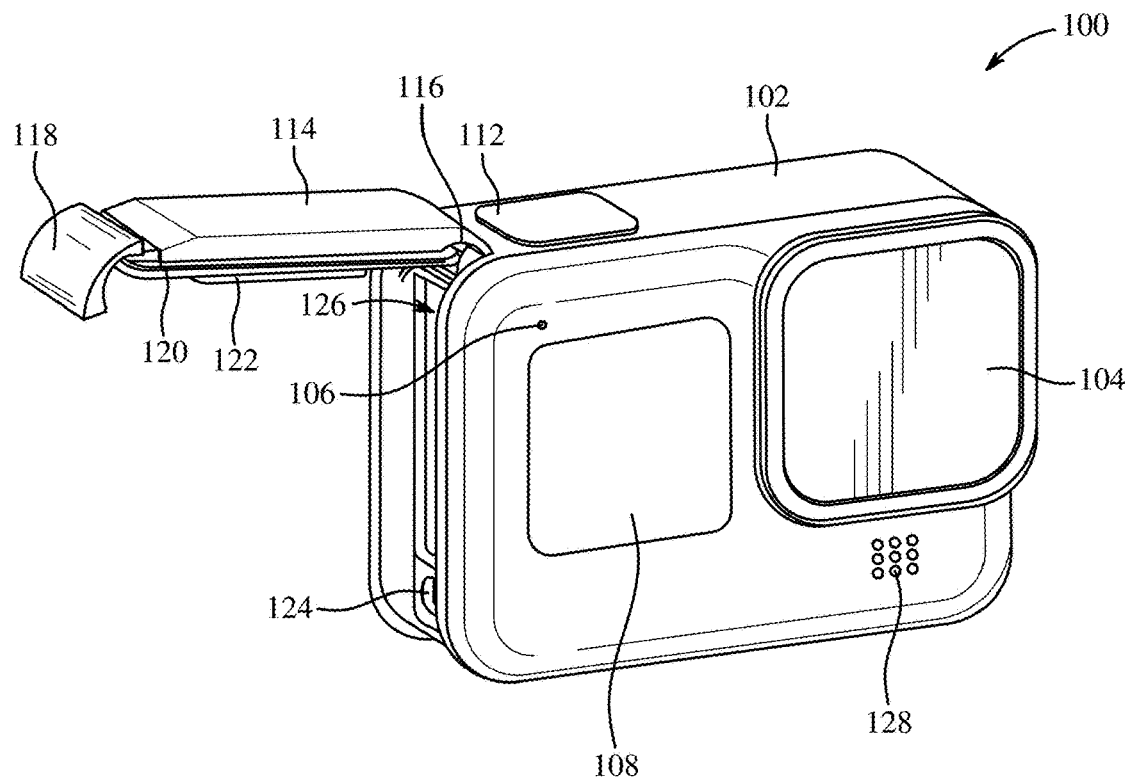
FIGS. 1A-1B are isometric views of an example of an image capture device.
Figure 1B:
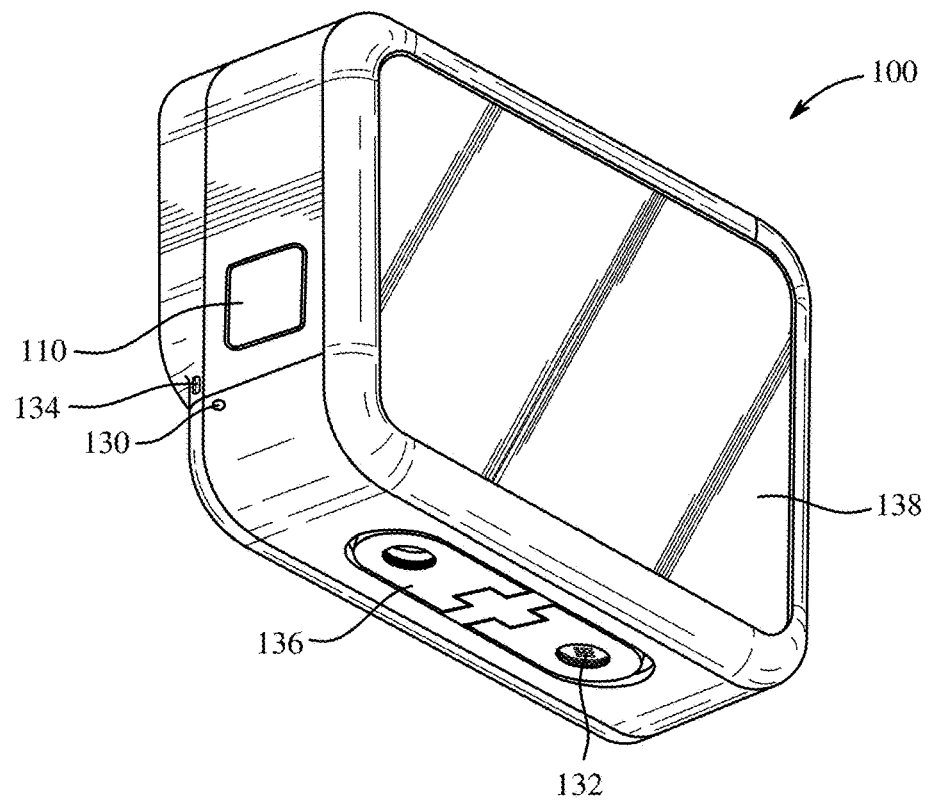

FIGS. 1A-1B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-1B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

The image capture device 100 may be used to implement some or all of the techniques described in this disclosure, such as the technique of sound removal shown and described in FIGS. 4A-6.

Figure 2A:
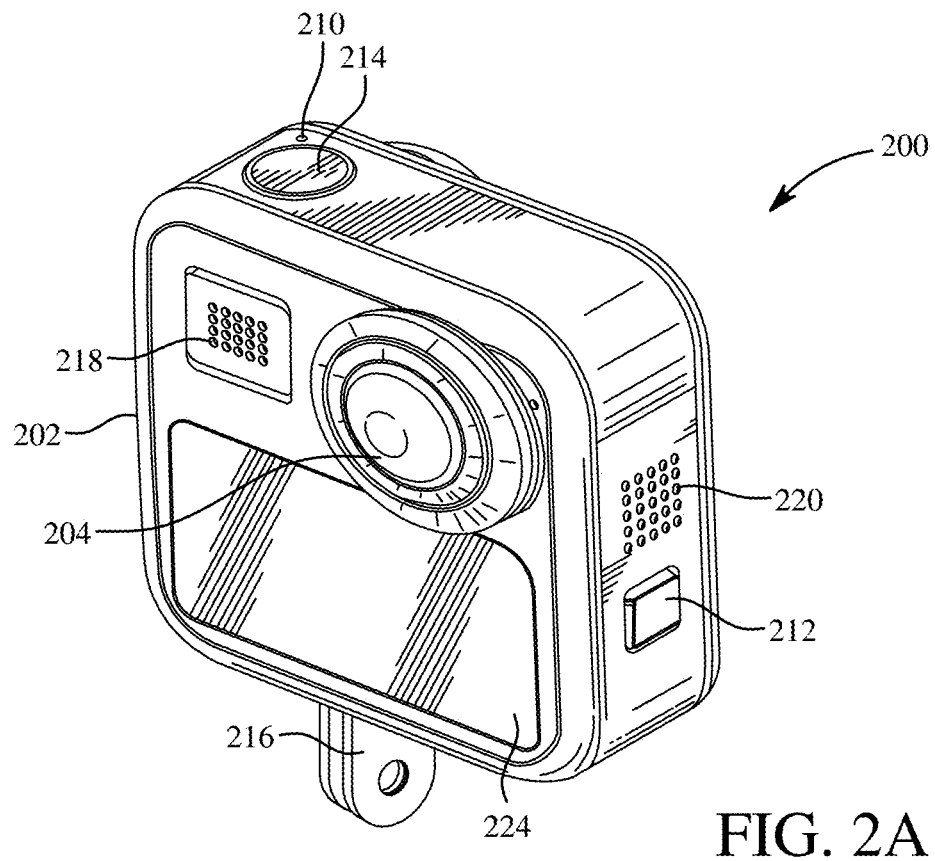
FIGS. 2A-2B are isometric views of another example of an image capture device.
Figure 2B:
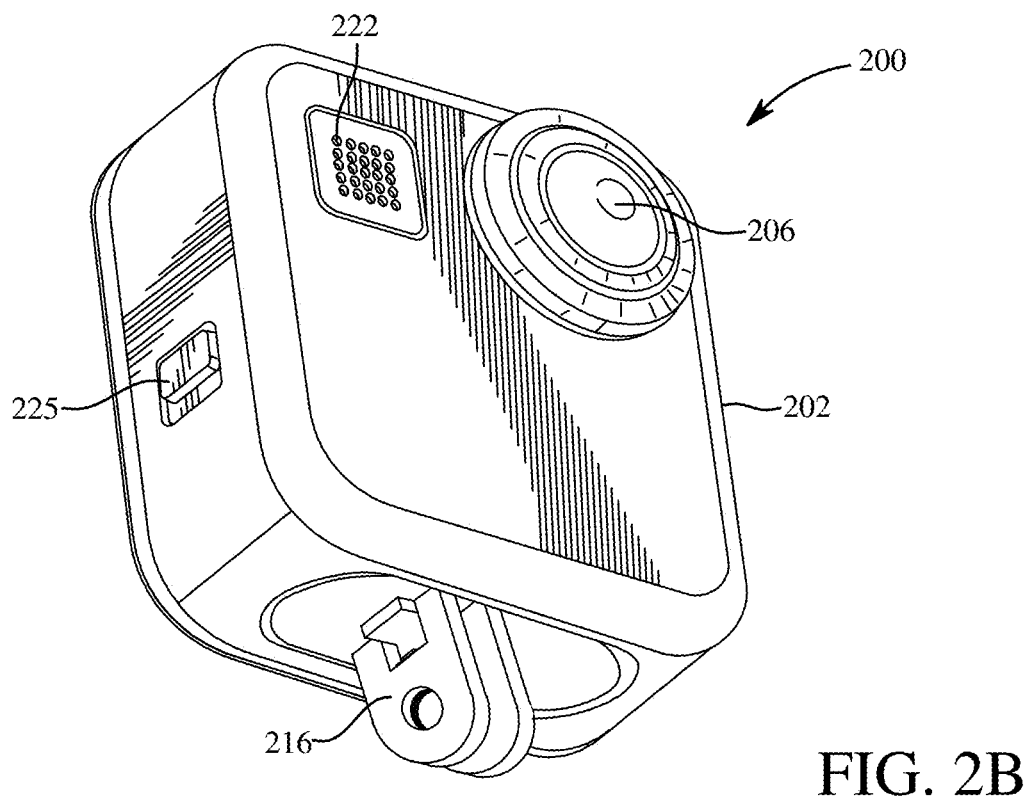

FIGS. 2A-2B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
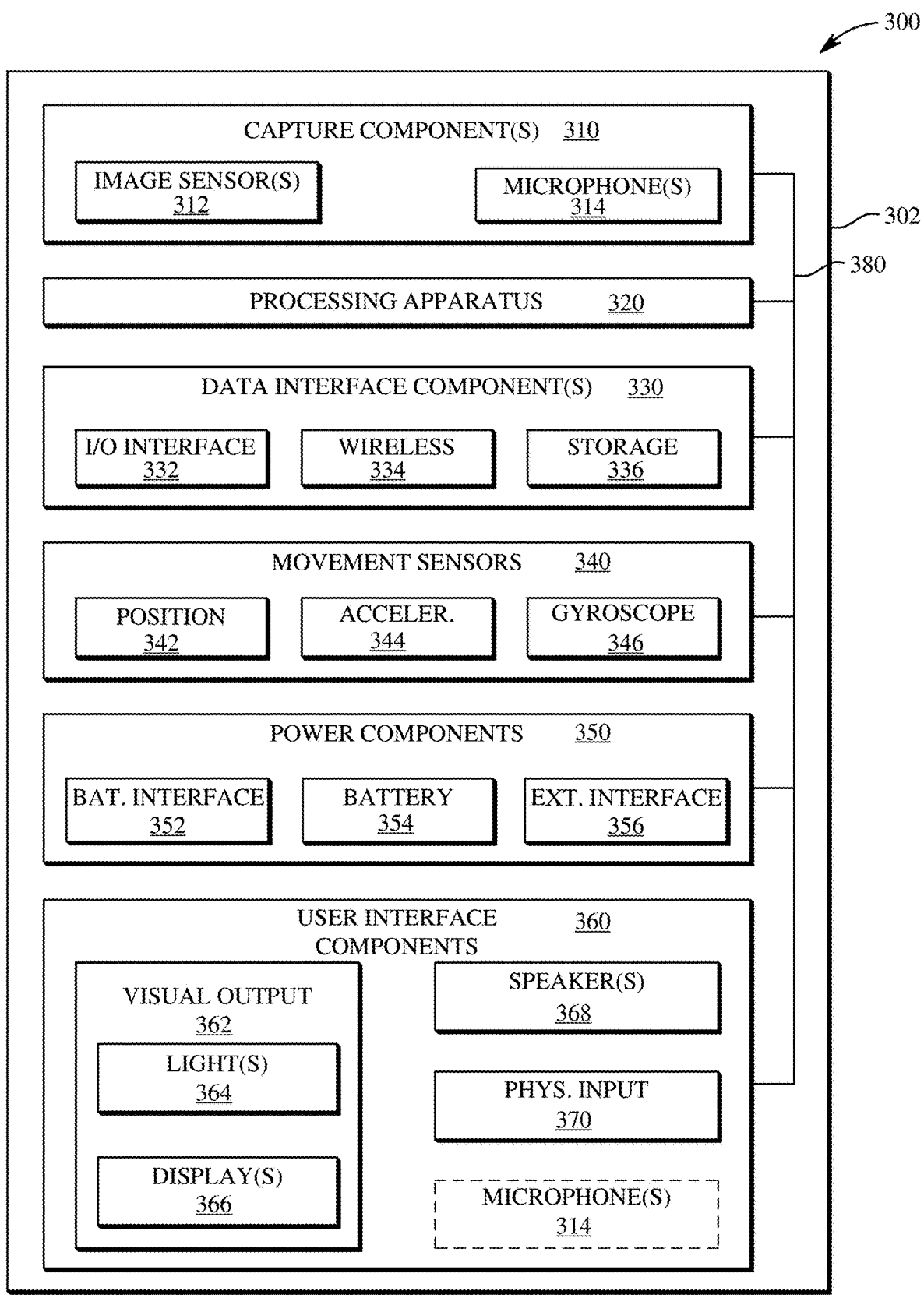
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-1B and 2A-2B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the sound removal technique described in FIGS. 4A-6.

Figure 4A:
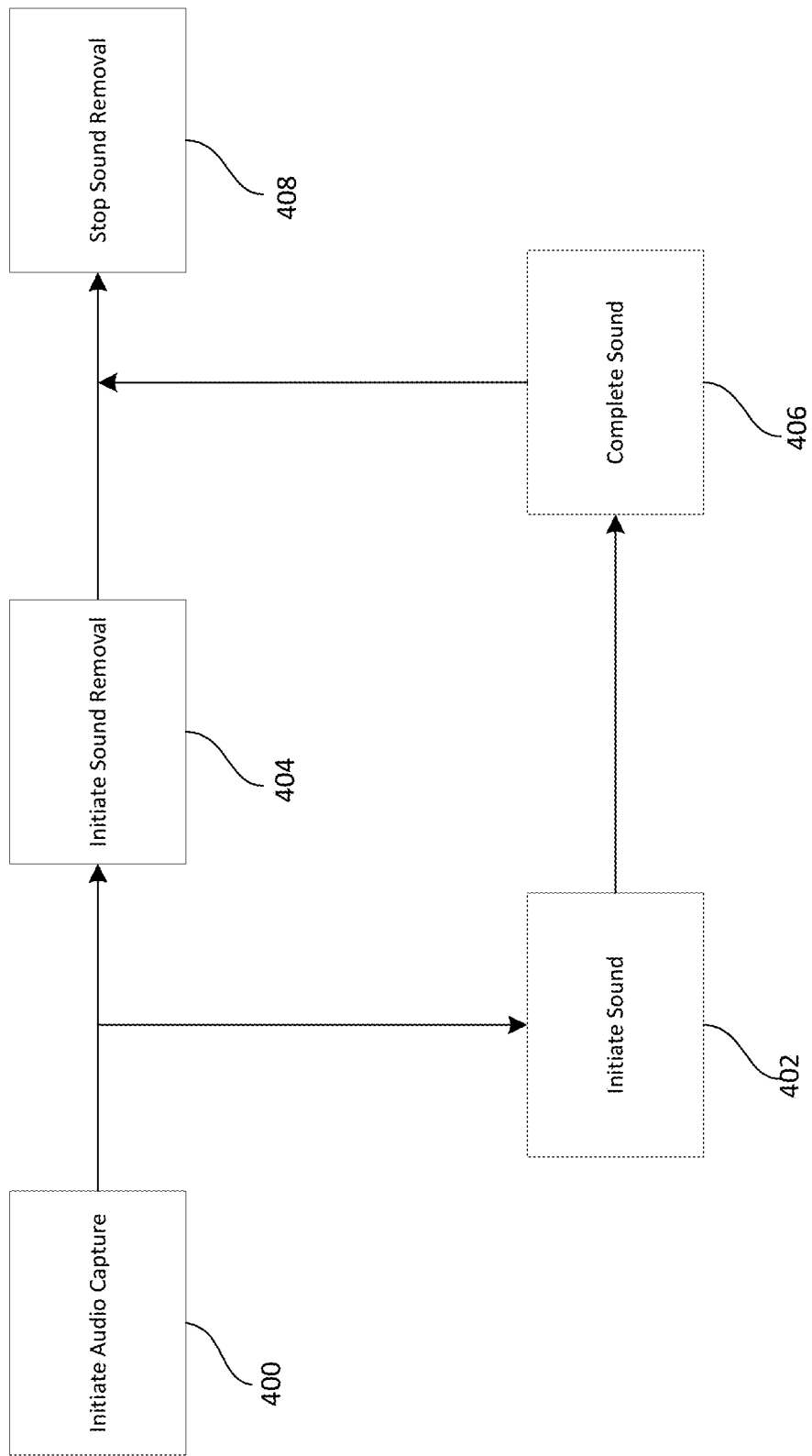
FIG. 4A is a block diagram of processing a recording to remove a sound.
Figure 4B:
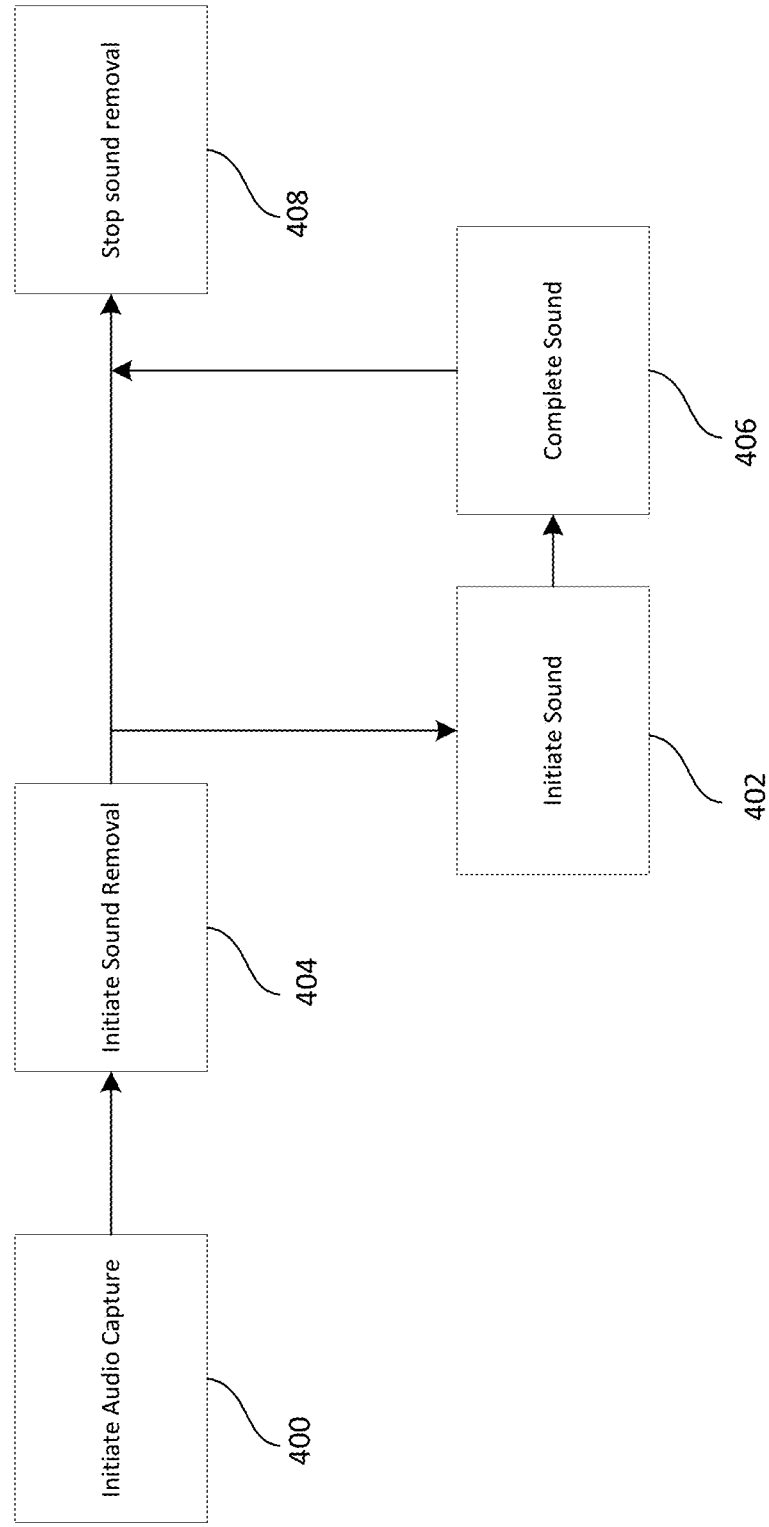
FIG. 4B is a block diagram of processing a recording to remove a sound.

FIGS. 4A and 4B illustrate block diagrams of processing a sound recording. The diagram of FIG. 4A begins by initiating an audio capture 400. During the audio capture 400, a sound 402 is produced, for example, by an image capture device that is performing the audio capture 400 while also capturing video, such as the image capture devices 100, 200, 300 taught herein.

The sound 402 indicates to a user that the device is on, the device is recording, or both. The sound 402 may be a beep, a whistle, a chime, a noise within a predetermined decibel range, a noise within a predetermined frequency range, have a predetermined frequency, or a combination thereof. The sound 402 may be created continuously or intermittently. The sound 402 may occur every 2 seconds or more, 5 seconds or more, 10 seconds or more, 15 seconds or more, or every 20 seconds or more. The sound 402 may occur every 5 minutes or less, 3 minutes or less, 1 minute or less, or 30 seconds or less. A user may select a frequency of the sound 402. A user may select a tone, decibel, frequency, or a combination thereof of the sound 402. A recording duration may be selected and the sound 402, frequency of the sound 402, or both may change as an end of the recording duration approaches. When the sound 402 is made, being prepared to be made, or has been made, the device (and/or apparatus) initiates a sound removal 404.

The sound removal 404 and the sound 402 production may be initiated at substantially the same time. The sound removal 404 may be initiated before the sound 402 is produced. The sound removal 404 may remove the sound 402 from an audio recording associated with a video recording captured by the device after the sound 402 is produced. The sound removal 404 may last a predetermined amount of time. The sound removal 404 may last a duration that is substantially a same duration as the sound 402. The sound removal 404 may have a duration that is greater than a duration of the sound 402 production so that the sound 402 is not present in the audio recording. The sound removal 404 may use any process, processing, or device that is sufficient to remove the sound 402 from the audio recording or to prevent the sound 402 from becoming a part of the audio recording.

The sound removal 404 may include applying a filter to the audio. The filter may be applied before the audio is captured, recorded, stored, or a combination thereof. The sound removal 404 may include applying a filter to remove any audio within a specific frequency range (e.g., including the sound 402). The sound removal 404 may include recording sounds that are outside of a predetermined frequency without recording sounds within the predetermined frequency (e.g., the sound 402). The sound removal 404 may produce tones configured to cancel the sound 402 at one or more microphones of the system. The sound removal 404 may include applying a notch filter, a frequency filter, cancellation by summation of antiphase signals, or both.

For example, the sound removal 404 may apply an inverse filter to an audio signal that removes the sound 402 from the audio signal. The inverse filter may be configured to cancel the sound 402 during sound removal 404. The inverse filter may be configured to apply a filter to a fundamental sound, a harmonic sound(s), or both so that the sound 402 is removed during sound removal 404. The sound removal 404 may apply to one or more channels, two or more channels, or three or more channels. When more than one channel is present, the sound removal 404 may apply to all the channels or each channel may individually include the sound removal 404 (e.g., three separate filters). The processor may include or perform one or more sound removals 404, two or more sound removals 404, or three or more sound removals 404. The sound removal 404 may only affect the sound 402 and may allow a remainder of the audio to remain unchanged. The sound removal 404 may be applied to the microphones individually or all the microphones at one time. The sound removal 404 may only be performed electronically. The sound removal 404 may be performed by a processor. The processor discussed herein may apply the sound removal 404. The processor may be configured to manipulate the sound 402 so that the sound is filtered.

The sound removal 404 may include a mechanical filter. For example, the mechanical filter may be a microelectromechanical filter (MEMS filter). The mechanical filter may be applied during sound removal 404 to muffle the sound 402 at the microphone. The sound removal 404 may occur for a predetermined amount of time or during the duration of the sound 402 until sound completion 406.

The sound completion 406 may terminate the sound 402 after a predetermined amount of time. The sound completion 406 may end the sound 402 so that normal audio recording resumes without the sound 402 being produced. The sound 402 from start to sound completion 406 may last 3 seconds or less, 2 seconds or less, 1 second or less, 1 decisecond or less, 1 centisecond or less, or 1 millisecond or less. The sound 402 from start to sound completion 406 last 1 picoseconds or more, 5 picoseconds or more, 1 nanosecond or more, 5 nanoseconds or more, 1 microsecond or more, 5 microseconds or more, or 1 millisecond or more. Once the sound completion 406 occurs the sound removal is stopped 408.

The stopping 408 of the sound removal permits all audio (e.g., noises) to be captured, recorded, obtained, or a combination thereof by the image capture device. The stopping 408 turns the filters off so that the audio recorded is unmanipulated. The stopping 408 returns the audio recording to an untouched recording state (e.g., all raw audio is captured). The audio may be retouched (e.g., noise limited). The audio may be retouched during noise removal, normal recording, or both. The stopping 408 remains until another sound 402 is scheduled to begin and the process of removing the sound 402 is repeated.

FIG. 4B begins by initiating an audio capture 400 with a microphone. The audio capture 400 may be captured with one or more microphones. The audio capture 400 may be performed after selecting between multiple microphones and only recording from one of the microphones. The audio capture 400 may begin when record or capture is pressed, for example, by a user. The audio capture 400 may occur as long as a video is being recorded. The audio capture 400 may be unfiltered, untouched, or both until a sound 402 is programmed to occur.

The sound 402 functions to indicate that a recording is occurring. The sound 402 is configured to indicate to a user that a video is being taken when the user is not able to see the image capture device such as the image capture devices 100, 200, 300. The sound 402 may be within a predetermined frequency range, have a predetermined duration, occur at a predetermined time, or a combination thereof. The sound 402 may be beeps, tones, have a specific frequency, or a combination thereof. The sound 402 may be any sound taught herein. The sound 402 may have a predetermined fundamental sound, harmonic sound, or both. The sound 402 may be within an audible range for most humans. The sound 402 may be initiated concurrently with or made after sound removal 404 is initiated.

The sound removal 404 may be turned on and then the sound 402 may occur so that the sound 402 is able to be removed, filtered out, or both (e.g., isolated) as the sound 402 is being made. The sound removal 404 may cancel the sound 402 such that the sound 402 is not recorded, stored in memory, or both (e.g., the audio or recording is free of the sound). The sound removal 404 may only affect the sound 402 and may not affect the other noises being recorded by image capture device. The sound removal 404 may only remove sounds 402 with a predetermined sound, frequency, duration, or a combination thereof. The sound removal 404 may begin before the sound 402 and continue until the sound completion 406.

The sound completion 406 may occur after a predetermined amount of time. The sound completion 406 may trigger the sound removal 404 to be stopped 408. When the sound removal 404 is stopped 408, normal recording (e.g., of both audio and video) resumes. When the sound removal 404 is stopped 408, the audio capture 400 may continue to record audio without a filter, without sound removal, or both.

Figure 5A:
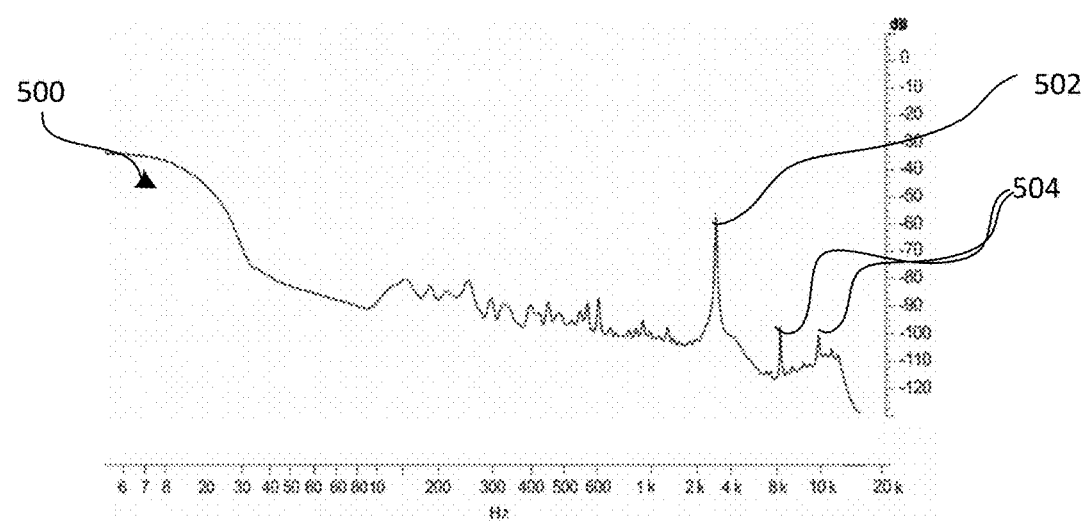
FIG. 5A illustrates a sound captured by a microphone.
Figure 5B:
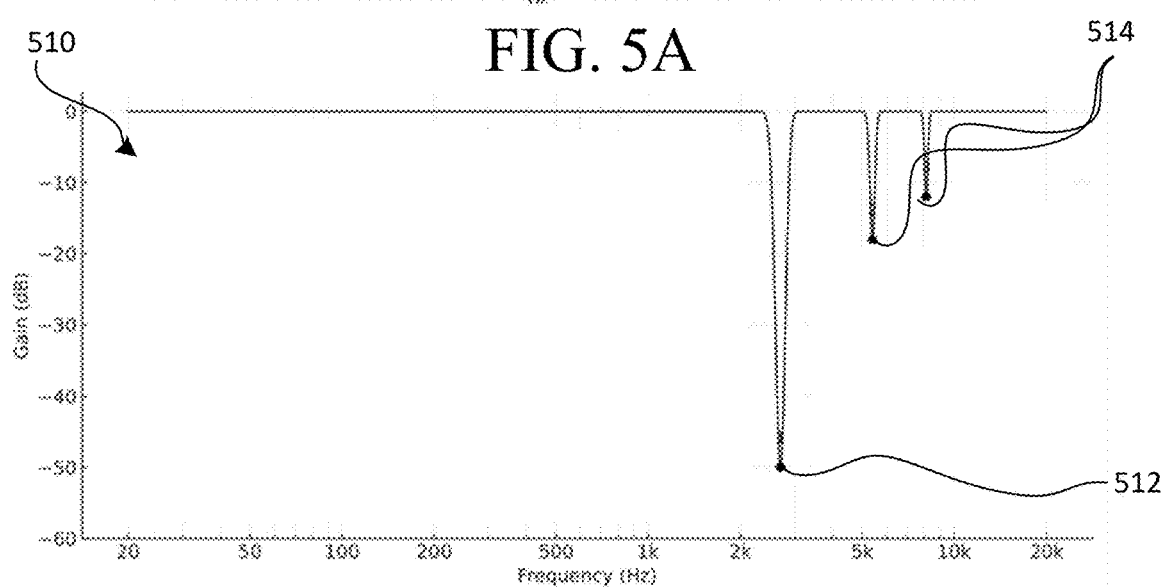
FIG. 5B illustrates a filter to remove a sound captured by the microphone.
Figure 5C:
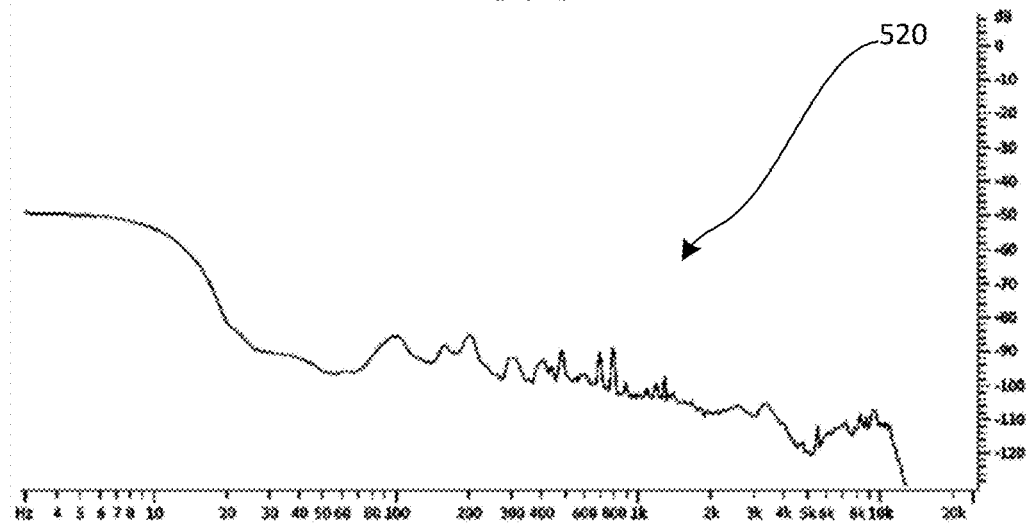
FIG. 5C illustrates a resulting signal after the sound is removed.

FIGS. 5A-5C illustrate graphs of an audio recording and the audio recording being filtered. FIG. 5A illustrates an unfiltered microphone diagram sound curve 500. The sound curve 500 begins recording before a sound is initiated and then the sound occurs. As shown, the sound includes a fundamental sound 502 and harmonic sounds 504. The fundamental sound 502 may be an initial sound that is received by a microphone (or two or more microphones). The fundamental sound 502 may be a normal tone that is produced by a speaker and captured by a microphone. The fundamental sound 502 may be a first sound recorded by a microphone. The fundamental sound 502 may be a primary sound or a loudest sound amount multiple sounds. The fundamental sound 502 may be a first sound recorded and then the harmonic sounds 504 may be recorded second or captured second.

The harmonic sounds 504 may be a non-ideal sound, sound distortion, reverberated sound, delayed sound, echo, or a combination thereof. The harmonic sounds 504 may have a different frequency than the fundamental sound 502. If more than one harmonic sound 504 is present, each harmonic sound 504 may increase in frequency approximately double (e.g., by adding an amount of frequency of the fundamental sound 502 together for each successive frequency of the harmonic sound 504). For example, as shown in FIG. 5A, the fundamental sound 502 has a frequency of about 3000 Hz, a first harmonic sound 504 has a frequency of about 6000 Hz, and a second harmonic sound 504 has a frequency of about 9000 Hz. As shown, the fundamental sound 502 and the harmonic sound 504 are ascertained and then a filter may be applied. The fundamental sound 502 and the harmonic sound 504 may be ascertained by selecting a predetermined sound. The device may be calibrated to ascertain the fundamental sound 502, the harmonic sound 504, or both. The device may be preprogrammed with the fundamental sound 502, the harmonic sound 504, or both. The device upon an initial turning on may play the sound and capture the sound to ascertain the fundamental sound 502, the harmonic sound 504, or both.

The sounds may be calibrated so that the fundamental sound 502 and the harmonic sounds 504 are in a predetermined range, at specific frequency, at specific decibel level, have a predetermined strength, have a predetermined characteristic, or a combination thereof.

FIG. 5B illustrates a filter curve 510. The filter curve 510 applies an inverse signal to the fundamental sound 502 and the harmonic sounds 504 so that the fundamental sound 502 and the harmonic sounds 504 are cancelled and/or removed. As shown, a fundamental filter 512 and harmonic filters 514 are applied that are commensurate in inverse size to the fundamental sound 502 and the harmonic sounds 504, respectively. For example, FIG. 5A shows that the fundamental sound 502 has a frequency of 3000 Hz and a volume of about 45 decibels above the nominal level (e.g., frequencies of surrounding sounds) and the fundamental filter 512 is applied around 3000 Hz and about-45 decibels such that the fundamental filter 512 may cancel substantially all (e.g., 90 percent or more or 95 percent or more) of the fundamental sound 502.

The fundamental filter 512, the harmonic filters 514, or both may essentially proportionally and/or inversely match the respective fundamental sound 502, the harmonic sounds 504, or both such that the fundamental sound 502, the harmonic sounds 504, or both are essentially completely removed (e.g., 80 percent or more, 90 percent or more, or even 95 percent or more of the sound is removed). The fundamental filter 512, the harmonic filters 514, or both are applied by a process, performed within a processor, or both.

FIG. 5C illustrates the filtered sound curve 520 when the filter curve 510 of FIG. 5B is applied to the sound curve 500 of FIG. 5A. As illustrated, the fundamental sound 502 and the harmonic sounds 504 are absent from the filtered sound curve 520.

Figure 6:
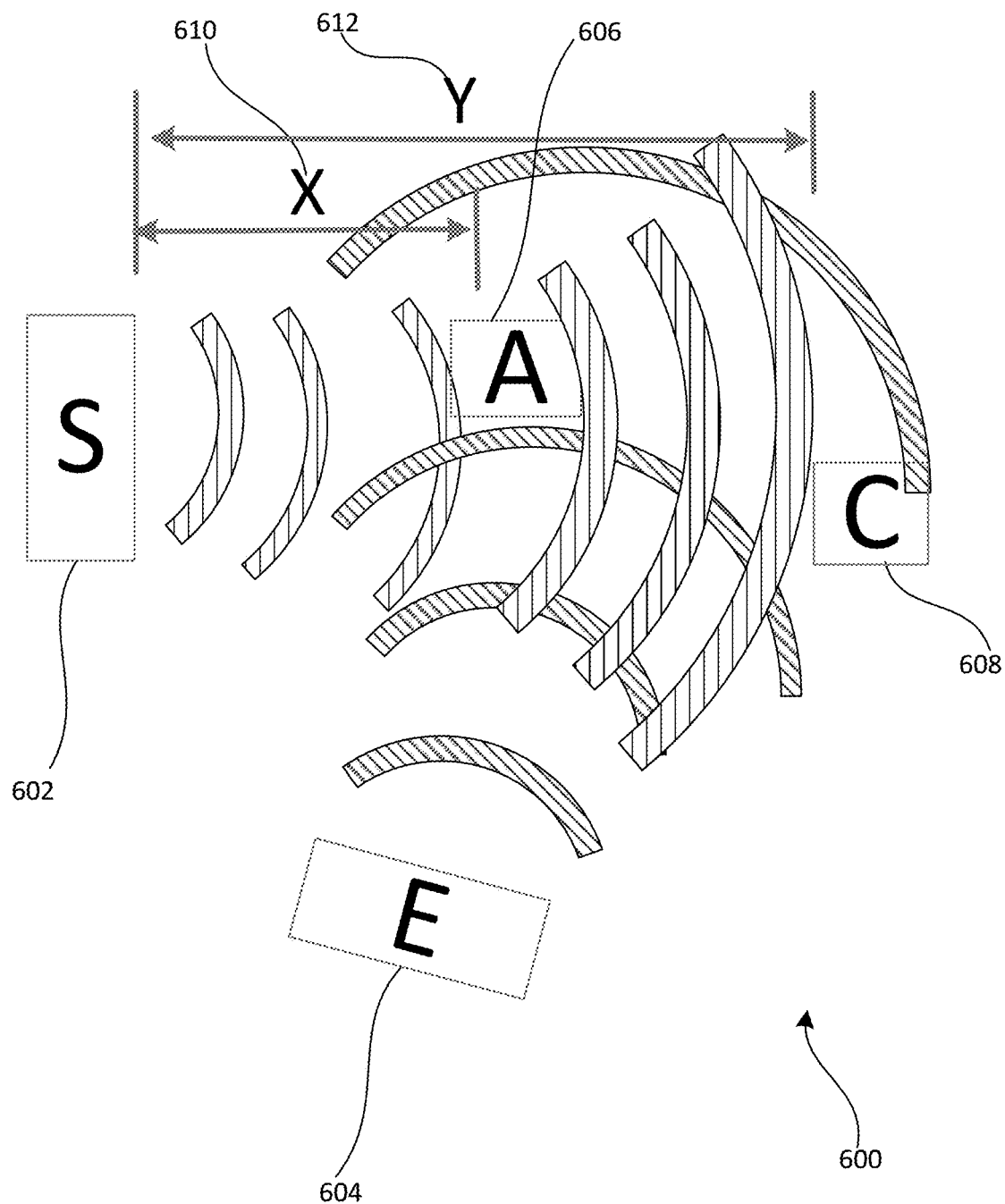
FIG. 6 illustrates removing a sound when the microphones are not equidistant from a speaker.

FIG. 6 illustrates an example of a sound and microphone diagram 600. The sound and microphone diagram 600 illustrates a first sound 602 from a first location (e.g., a speaker of the image capture device, labeled "S") and a second sound 604 from a second location (e.g., people or a surrounding environment, labeled "E"). The first sound 602 hits a first microphone 606 (labeled "A") first and then a second microphone 608 (labeled "C") second. The first sound 602 is located a distance X 610 from the first microphone 606. The first sound 602 is located a distance Y 612 from the second microphone 608. The distance X 610 is smaller than that distance Y 612. The distance X 610 and the distance Y 612 may be determined based upon a location of the microphones 606 and 608 on the image capture device 100, 200, 300. For example, if the microphones 606 and 608 are located on the front and back (e.g., spaced by a thickness of the image capture device) the difference between the distance X 610 and the distance Y 612 (e.g., a distance apart) may be less than if the microphones 606 and 608 are located on a left side and a right side (e.g., spaced by a length of the image capture device) such as when the image capture device is similar to the image capture device 100, 200, or 300.

FIG. 6 illustrated leveraging multiple microphones (e.g., the first microphone 606 and the second microphone 608) to remove the sound by subtracting one microphone from another given the known microphone and speaker placements. Filtration of an audio signal received by the first microphone 606 will occur and the audio signal received by the second microphone 608 will be filtered so that the sound is removed and the ambient sound is preserved (i.e., filtration will occur such as the filtration occurring removes the sound and the ambient sound is preserved). The delay may be calculated based upon a distance between the distance X 610 and the distance Y 612 and an amount of time it takes the first sound 602 to travel that distance.

The first sound 602 may be a sound created by a speaker in the image capture device. The first sound 602 is monitored and filtered while the second sound 604 is being recorded and captured by the first microphone 606 and the second microphone 608. Calibration may be applied to the image capture device so that the filter may be applied accurately to the first sound 602 based upon the difference between the first distance X 610 and the second distance Y 612. The microphone 606, 608 with the cleanest, loudest, or otherwise determined best audio may be selected and then the filter only applied to the selected microphone, e.g., either the first microphone 606 or the second microphone 608.

A step of calibrating may be applied universally to all image capture devices with a specific orientation of the first microphone 606 to the second microphone 608. Calibration may have to be applied to every image capture device individually. Calibration may calibrate when the filter is applied, how long the filter is applied, an intensity or frequency of the audio to be recorded, a fundamental sound, a harmonic sound, or a combination thereof. The step of calibration may be performed by a processor taught herein. The processor may perform the processes taught herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
    a speaker configured to produce a sound that audibly communicates information to a user;
    a microphone configured to receive the sound; and
    a processor configured to:
        cause the speaker to produce the sound to audibly communicate the information to the user;
        capture a video that includes audio;
        initiate a sound removal process to remove the sound from the audio; and
        after the sound is produced, stop the sound removal process,
    wherein the sound is a beep or a chime and the sound removal process lasts about 5 seconds or less.

2. The apparatus of claim 1, wherein the processor is further configured to produce a recording that includes the audio that is free of the sound.

3. The apparatus of claim 1, wherein the sound removal process to remove the sound includes a notch filter.

4. The apparatus of claim 3, wherein the notch filter removes a fundamental sound and harmonics sounds.

5. The apparatus of claim 1, wherein the sound removal process to remove the sound includes a frequency filter.

6. The apparatus of claim 1, wherein the sound removal process removes the sound by filtering three channels with three separate filters.

7. The apparatus of claim 1, wherein the processor is further configured to calibrate the sound removal process for the apparatus to isolate characteristics of the sound, a strength of harmonics of the sound, or both, and wherein the processor is further configured to filter only sounds within a predetermined specific range.

8. The apparatus of claim 7, wherein the information audibly communicated relates to information displayed on an interactive display of the apparatus.

9. The apparatus of claim 1, wherein the microphone is two or more microphones that are located a distance apart and the sound is removed from the two or more microphones based upon the distance between the two or more microphones so that the sound is removed.

10. A method comprising:
    initiating a sound removal process;
    after initiation of the sound removal process, producing a sound that audibly communicates information to a user;
    upon completion of producing the sound, stopping the sound removal process; and
    producing a recording including audio that is free of the sound,
    wherein the sound is a beep or a chime and the sound removal process lasts about 5 seconds or less.

11. The method of claim 10, further comprising:
    applying a notch filter to the sound to remove a fundamental sound and a harmonic sound.

12. The method of claim 10, further comprising:
    displaying the information to the user via a touch screen of an image capture device while audibly communicating the information.

13. The method of claim 12, wherein the information comprises camera mode, battery life, or memory card capacity.

14. The method of claim 10, further comprising:
    applying a frequency filter, and
    filtering three audio channels with three separate filters.

15. The method of claim 14, further comprising:
calibrating the sound removal process for an apparatus to isolate characteristics of the sound, a strength of harmonics of the sound, or both.

16. The method of claim 15, wherein the sound is within a predetermined specific frequency range and the method further comprises filtering out only sounds within the predetermined specific frequency range.

17. The method of claim 10, wherein removing the sound by subtracting a first microphone from a second microphone is based on a position of the first microphone with respect to the second microphone.

18. An image capture device comprising:
a speaker configured to produce a sound that audibly communicates information to a user;
a microphone configured to receive the sound and additional sounds;
an image sensor configured to capture a video while the microphone is receiving the sound and the additional sounds; and
a processor configured to:
initiate a sound removal process to remove the sound from a recording that includes the sound and the additional sounds;
produce the sound to audibly communicate the information; and
stop the sound removal process after a predetermined amount of time,
wherein the sound is a beep or a chime and the sound removal process lasts about 5 seconds or less.

19. The image capture device of claim 18, wherein the information audibly communicated relates to information displayed on an interactive display of the image capture device.

20. The image capture device of claim 18, wherein the processor is calibrated to ascertain a fundamental sound of the sound so that the sound is removed from the recording.

* * * * *